(12) United States Patent
Desiderioscioli et al.

(10) Patent No.: US 10,066,350 B2
(45) Date of Patent: Sep. 4, 2018

(54) MODULAR ANTI-IMPACT PROTECTION

(71) Applicant: STOMMPY S.R.L., Rubiera (Reggio Emilia) (IT)

(72) Inventors: Paolo Desiderioscioli, Reggio Emilia (IT); Alessandro Monzani, Campogalliano (IT); Bogdan Ionut Voicu, Cadelbosco di Sopra (IT); Juri Spadoni, Reggio Emilia (IT)

(73) Assignee: STOMMPY S.R.L., Rubiera (IT)

( * ) Notice: Subject to any disclaimer, the term of this patent is extended or adjusted under 35 U.S.C. 154(b) by 0 days.

(21) Appl. No.: 15/500,194

(22) PCT Filed: Mar. 6, 2015

(86) PCT No.: PCT/IB2015/051636
§ 371 (c)(1),
(2) Date: Jan. 30, 2017

(87) PCT Pub. No.: WO2016/016736
PCT Pub. Date: Feb. 4, 2016

(65) Prior Publication Data
US 2017/0233962 A1    Aug. 17, 2017

(30) Foreign Application Priority Data

Jul. 31, 2014 (IT) .............................. MO2014A0230

(51) Int. Cl.
*E01F 15/14* (2006.01)
*B65G 1/02* (2006.01)
*E01F 9/658* (2016.01)

(52) U.S. Cl.
CPC ................ *E01F 15/14* (2013.01); *B65G 1/02* (2013.01); *E01F 9/658* (2016.02); *E01F 15/141* (2013.01); *B65G 2207/28* (2013.01); *B65G 2207/40* (2013.01)

(58) Field of Classification Search
CPC ......... E01F 15/14; E01F 15/141; E01F 9/658; B65G 2207/28
USPC ....................................... 404/6–11; 256/13.1
See application file for complete search history.

(56) References Cited

U.S. PATENT DOCUMENTS

| | | | | |
|---|---|---|---|---|
| 1,903,869 A | * | 4/1933 | Meister | E01F 9/629 40/608 |
| 2,121,961 A | * | 6/1938 | Gill | E01F 9/629 116/63 P |
| 3,674,304 A | * | 7/1972 | Swanson | B62D 33/0207 105/382 |
| 4,240,766 A | * | 12/1980 | Smith | E01F 9/677 248/160 |
| 4,373,464 A | * | 2/1983 | Blau | F16F 3/10 116/63 R |

(Continued)

FOREIGN PATENT DOCUMENTS

| | | |
|---|---|---|
| EP | 2685002 A1 | 1/2014 |
| FR | 2953534 A1 | 6/2011 |

(Continued)

*Primary Examiner* — Raymond W Addie
(74) *Attorney, Agent, or Firm* — Pearne & Gordon LLP

(57) ABSTRACT

A modular anti-impact protection, comprising a main module (10), comprising: an outer body (11), which has at least one internal cavity; an inner body (12), provided with at least one internal cavity, and configured to be inserted at least partially into the cavity of the outer body (11).

25 Claims, 6 Drawing Sheets

(56) References Cited

U.S. PATENT DOCUMENTS

| | | | | |
|---|---|---|---|---|
| 5,273,371 | A * | 12/1993 | Hugron | E01F 9/629 404/10 |
| 5,597,262 | A * | 1/1997 | Beavers | E01F 9/627 116/63 P |
| 5,634,733 | A * | 6/1997 | Sperduti | F16B 7/0413 256/13.1 |
| 5,785,409 | A * | 7/1998 | Reinert, Sr. | B64F 1/20 174/57 |
| 5,899,628 | A * | 5/1999 | Pei-Chi | E01F 9/642 404/6 |
| 6,769,833 | B2 * | 8/2004 | Dicke | E01F 9/629 40/608 |
| 7,930,859 | B1 * | 4/2011 | Eslambolchi | E01F 9/629 248/159 |
| 8,444,343 | B2 * | 5/2013 | McCue | E01F 9/629 256/13.1 |
| 8,827,231 | B1 * | 9/2014 | Blair | A63B 71/023 248/507 |
| 8,915,670 | B2 * | 12/2014 | Ustach | E01F 15/141 404/10 |
| 9,303,374 | B2 * | 4/2016 | Oberkofler | E01F 9/673 |
| 9,580,878 | B2 * | 2/2017 | Kollbaum | E01F 9/623 |
| 2009/0080971 | A1 * | 3/2009 | Schram | E01F 13/046 404/6 |
| 2010/0031546 | A1 * | 2/2010 | Nwatu | G09F 15/0062 40/607.1 |
| 2014/0154007 | A1 | 6/2014 | Ustach et al. | |

FOREIGN PATENT DOCUMENTS

| | | | | |
|---|---|---|---|---|
| GB | 2197900 | * | 11/1986 | E01F 9/01 |
| WO | 2011077392 | A2 | 6/2011 | |

* cited by examiner

MODULAR ANTI-IMPACT PROTECTION

The present invention relates to a modular anti-impact protection.

Advantageously, but not exclusively, the protection in question can be used to safeguard interior and exterior environments of industrial plants against impacts produced during the handling of goods or movement of people. The aforesaid handling and movement can take place with means of varying size and weight depending on the type of logistics involved in the area in question. In fact, the means used can range from a simple shopping trolley to a diesel forklift truck. The protection in question can be installed, in particular, along sharp edges and corners, panels or machinery to be protected in the event of incorrect operations on the part of personnel assigned to use the means intended for handling the goods.

At present, specific protection of environments can be sought using protection bollards of varying nature.

An example of protection bollards consists of posts made entirely of a metal material. Such products are obtained by welding together commercial pieces of steel of varying sizes and cross sections, as well as from the possible use of forged pieces. Subsequently, a coating of paint is applied on the surface to prevent the creation of surface oxidation to the extent possible and as long as the product remains intact. An alternative to paint is the use of stainless steel. Being hollow, the bollards in question may or may not be filled with inert material to increase their rigidity. Moreover, the aforesaid products also differ in the type of anchorage to the floor or pavement, which can be achieved using a bolt-down plate or by embedding the shaft in the floor or pavement.

A second example of prior art includes protection bollards obtained from extruded polymer rods. In this case the bollards are obtained by turning an extruded rod made of polymeric material on a lathe. The machining is necessary in order to obtain a seat for the system of anchoring them to the ground, which is done by means of anchorage systems that use studs or other anchorage systems specifically conceived for application on cement screeds. In this type of protection there are no problems of external oxidation of the product, even in the event of surface scratches. In this case the inner core, which keeps the protection anchored to the ground, is made entirely of steel. The upper part of the protection, where the seat necessary for the anchorage system is present, is covered by using a cap, also made of plastic material (soft or rigid), applied by mechanical interference with the seat itself. This cap also has the task of sealing off the product against the infiltration of liquids, to the extent possible.

Alternatively, the shaft of the bollard can be obtained from a tube made of polymeric material, of varying diameter and thickness. The base of the bollard consists of a steel bracket of varying size, necessary for anchoring the product to the floor or pavement using expansion screw anchors of varying size depending on the application. In some types there may be elastic elements between the flange and shaft which improve the elastic absorption of impacts. In one variant of this type of bollard there may be an inner core, consisting of a steel column, which can in turn be coated with a rubbery material. Another variant of these protections consists of a bollard, likewise obtained from an extruded tube, but with the use of a base made of plastic material welded (melted) to the shaft itself. In this case the anchorage to the ground can also be achieved with systems other than the classic expansion screw anchor. Naturally, in this type of bollard as well, the upper part is closed off by using a cap, again made of plastic material (soft or rigid), applied by mechanical interference with the seat itself. This cap also has the task of sealing off the product against the infiltration of liquids, to the extent possible.

In a further alternative the bollard can be obtained by processing polymeric material using rotational moulding technology. The protection can be made entirely of plastic material, or else integrated with a rigid flange for anchorage to the ground. Given the nature of the technology used, these bollards are characterized by very small thicknesses. Naturally, from what has been said it may be clearly deduced that this type of protection has a different field of application from the previous ones; in fact, they have a much lower level of impact resistance. On the other hand, they are largely used as non-invasive signalling and delimiting elements, rather than as impact attenuators or shock absorbers. And they exploit flexibility as an element for returning into position after being impacted so as not to damage the vehicles they impact.

The protections of a known type presently available display numerous drawbacks, such as:
  in the event of damage, sheet metal shafts can generate areas that may cause cutting or snagging, as well as creating areas of dirt accumulation, unacceptable for accident prevention purposes and not compatible in the market with food and pharmaceutical environments;
  in the event of scratching, painted sheet metal shafts can generate areas of oxidation that are absolutely incompatible with hygiene standards, especially in the food and pharmaceutical sectors;
  in the case of protections with a fastening flange, there is the problem of the exposed fastenings, in some cases protruding, which besides creating areas for the accumulation of impurities can generate areas of accidental snagging and consequently cause injuries;
  if painted protections are used, there are considerable problems, even if they are intact, with the specifications defined by food and hygiene standards, due to the emission of solvents by paints;
  hollow steel protections or ones obtained from extruded polymer tubes can undergo perforations resulting in the creation of cavities which liquids and impurities could work their way into and accumulate;
  in the event of solid or partly solid protections, there is a considerable limitation in the height of the shafts, which are limited by the machinability of the solid raw workpieces;
  both polymer and steel protections that use welding have considerable fragility under impact precisely along the welds;
  the use of a fastening flange considerably increases the usable surface area occupied by the system and creates points where the shoes of personnel or the wheels of forklifts and forklift trucks could get caught;
  in the event of fastenings inside the protection, there is a considerable fragility in the area of the interference fit caps, which, in the event of an impact, pop out or in any case do not maintain a tight seal;
  in the event of hollow protections, there is the creation of humidity and areas of impurities within the internal hole;
  in the event of steel bollards partially embedded in the floor or pavement and filled with inert material, there is an excessive rigidity of the pieces, which, in the event of considerable impacts, causes all of the impact energy to rebound against the operator;
  in the event of bollards with systems interposing rubber between the shaft and base, an excessive deformation occurs in the event of impacts of considerable entity and thus they offer no protection against the impact;

in all cases it may be observed that after an accidental impact of slight entity (low energies) the system tends immediately to have a permanent deformation, without an elastic return into the initial position.

The principal object of the present invention is to enable the construction of an anti-impact protection which solves the majority of the problems found in the currently available products. With the invention, the two main problems that are observed in the presently sold products are eliminated, i.e. the permanent deformations generated even under impacts of modest entity are eliminated and the limitations to the height of the protections are eliminated.

The protection according to the present invention moreover makes it possible to obtain important advantages, including:

impermeability to liquids and dirt over the whole surface of the protection;

possibility of complying with regulatory requirements with respect to accidental contact with foodstuffs, in all exposed parts of the invention;

reduction in the specific weight of the invention compared to the present products, mechanical strength being equal;

possibility of disassembling the protection and performing maintenance only on part of it;

possibility of using the invention in different sectors (food, pharmaceuticals, logistics, mechanics, town planning, etc.)

Additional features and advantages of the present invention will become more apparent from the description that follows, given by way of non-limiting example with the aid of the appended figures, in which.

Figure 1:
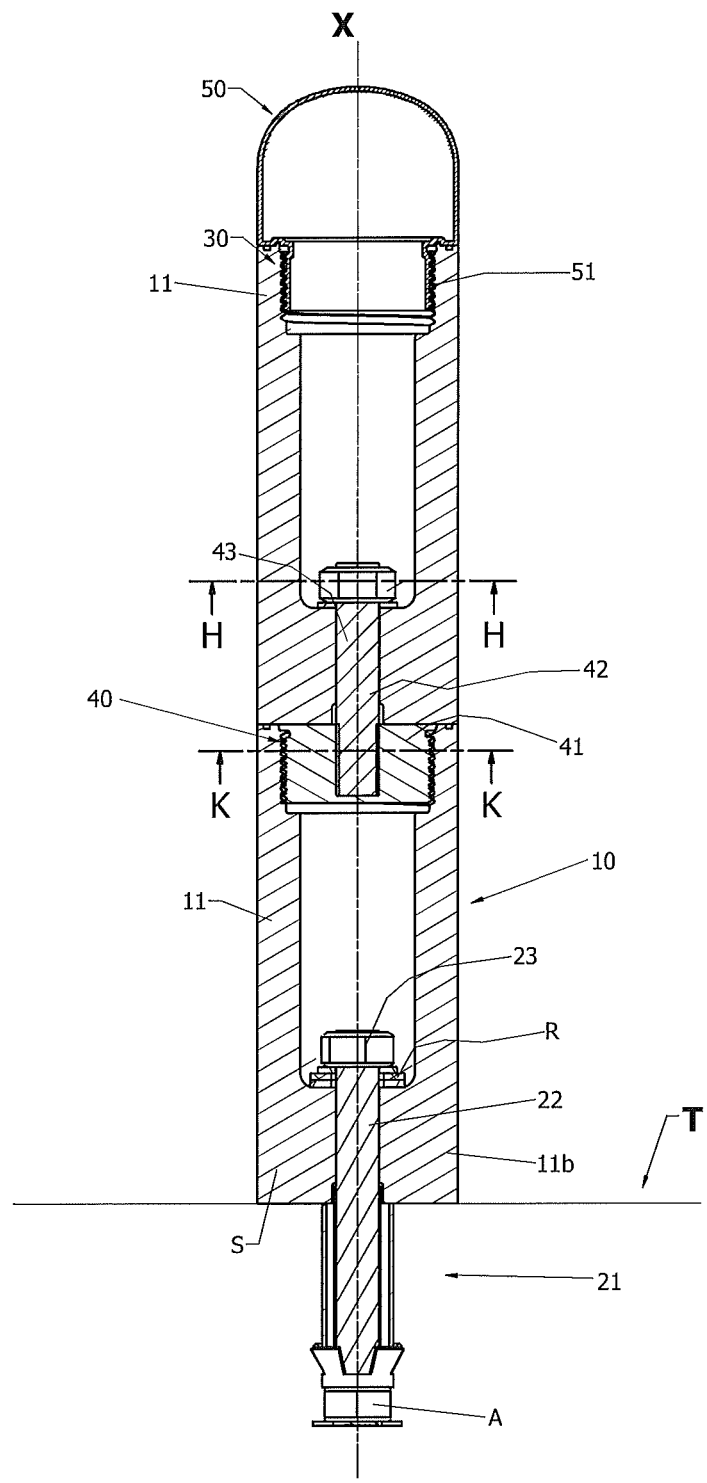
FIG. 1 shows a first embodiment of the anti-impact protection according to the present invention, in a section view taken on an axial plane containing a longitudinal axis (X)

The modular anti-impact protection according to the present invention comprises a main module (10). The main module (10) comprises an outer body (11), which has at least one internal cavity. Preferably, but not exclusively, the outer body (11) has a cylindrical conformation, concentric with a longitudinal axis (X). The outer body (11) is provided with a bottom portion (11b). Preferably the bottom portion (11b) is provided with a through seat, preferably configured as a through hole.

The main module (10), comprising the outer body (11), is constrainable to a base (T), i.e. a floor, or another supporting surface.

An anchorage means (21) is structured so as to removably constrain the outer body (11) to the base (T). The anchorage means (21) is associable with the outer body (11) and with the base (T).

In a preferred embodiment, the anchorage means (21) comprises a rod (22), disposed in the seat passing through the outer body (11). In particular, in the preferred embodiment the rod (22) is disposed through the bottom portion (11b) of the outer body (11).

The anchorage means (21) preferably comprises a fastening element (23), constrainable to the rod (22) and structured so as to fasten the outer body (11) to the base (T). Preferably, the anchorage means (21) is structured so as to fasten the bottom portion (11b) of the outer body (11) to the base (T).

In the preferred, but not exclusive embodiment, the rod (22) is provided with an outer thread and the fastening element (23) comprises a nut structured so as to be screwed onto the thread of the rod (22). The rod (22) is disposed through the bottom portion (11b) of the outer body (11), so that the fastening element (23) is placed in such a way as to be tightened in contact with the bottom portion (11b) of the outer body (11). In particular, the outer body (11) is preferably provided with an internal cavity. The rod (22), or at least one end portion thereof, is disposed inside the internal cavity of the outer body (11). The fastening element (23) is disposed inside the internal cavity of the outer body (11). As can be seen in FIG. 1, the fastening element (23) is fastened in contact with an upper surface of the bottom portion (11b) of the inner body (11). One or more washers (R) can be interposed between the fastening element (23) and the upper surface in order to distribute the tightening force over a larger surface.

The rod (22) is in turn associated with an anchorage body (A), configured to be constrained to the base (T). A preferred embodiment of the anchoring means (21) is described in patent application EP2685002, in the name of the same applicant.

The hollow conformation of the outer body (11), delimited by the bottom portion (11b), allows the anchorage of the main module (10) to be maintained in a lower area, substantially coinciding with the area of the bottom portion (11b). This makes it possible for most of the impact energy to be absorbed by the outer body (11), and in particular by the bottom portion (11b). In a preferred embodiment, the outer body (11) is made of polymeric plastic materials, so that the impact energy is elastically absorbed by the bottom portion (11b), which tends to be compressed and is transmitted to the anchorage means (21) only to a limited degree, thus reducing the stresses on the anchorage means.

In a second embodiment, illustrated in FIGS. 2 to 6, the main module (10) further comprises an inner body (12), configured to be inserted at least partially into the cavity of the outer body (11). In a preferred, but not exclusive embodiment, the inner body (12) has a cylindrical conformation. In the version illustrated in FIG. 2, the inner body (12) comprises an insertion portion (12a), shaped so that it can be inserted concentrically into the outer body (11). In the alternative version shown in FIGS. 3 and 5, the inner body (12) comprises an end portion (12c), having a larger diameter than the insertion portion (12a), which is shaped so as to abut against an upper end of the outer body (11). In the preferred cylindrical conformation, the end portion (12c) has substantially the same outer diameter as the outer body (11) and, essentially, it prolongs the length thereof along the longitudinal axis (X).

In all of the versions represented, the inner body comprises a bottom portion (12b). The bottom portion (12b) is connected to the insertion portion (12a), at an opposite end relative to the end portion (12c). The bottom portion (12b) is provided with a through seat, preferably configured as a through hole. The through seat of the bottom portion (12b) of the inner body (12) is disposed in such a way as to be aligned with the through seat of the bottom portion (11b) of the outer body (11). Preferably, the inner body (12), too, has an internal cavity, delimited at the bottom by the bottom portion (12b) and open at the top.

Figure 2:
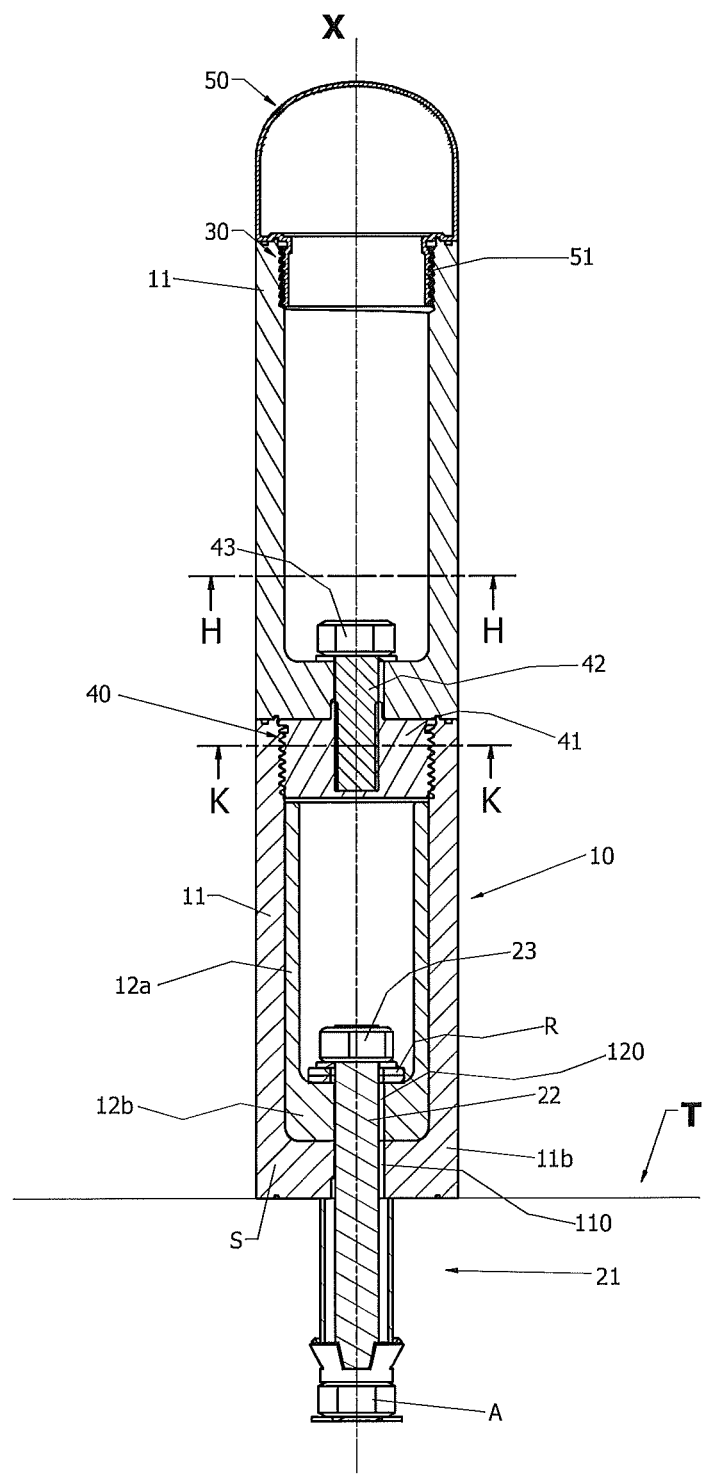
FIG. 2 shows a second embodiment of the anti-impact protection according to the present invention, in a section view taken on an axial plane containing a longitudinal axis (X)
Figure 3:
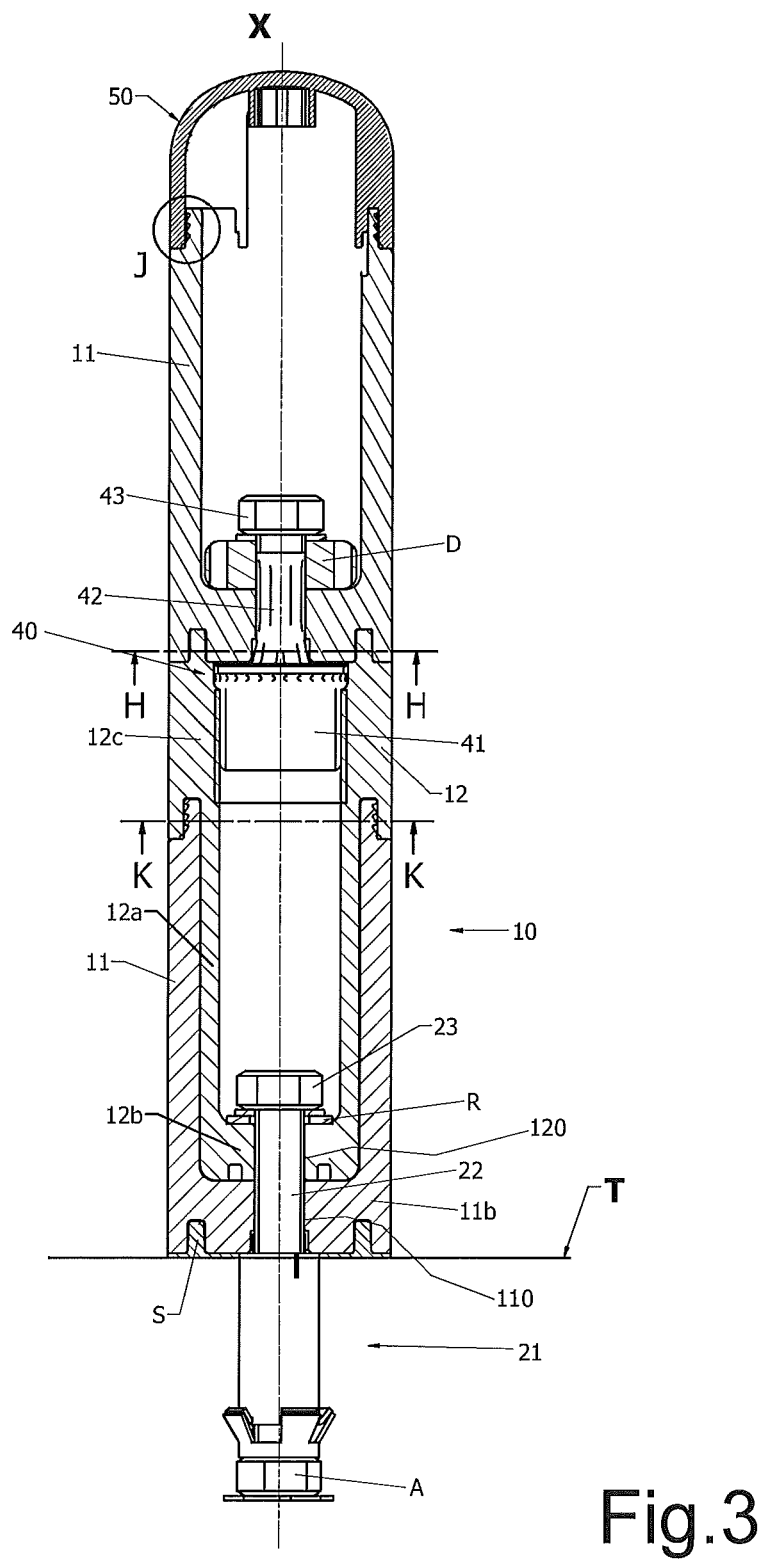
FIG. 3 shows a third embodiment of the protection according to the present invention, in a section view taken on an axial plane containing a longitudinal axis (X)
Figure 4:
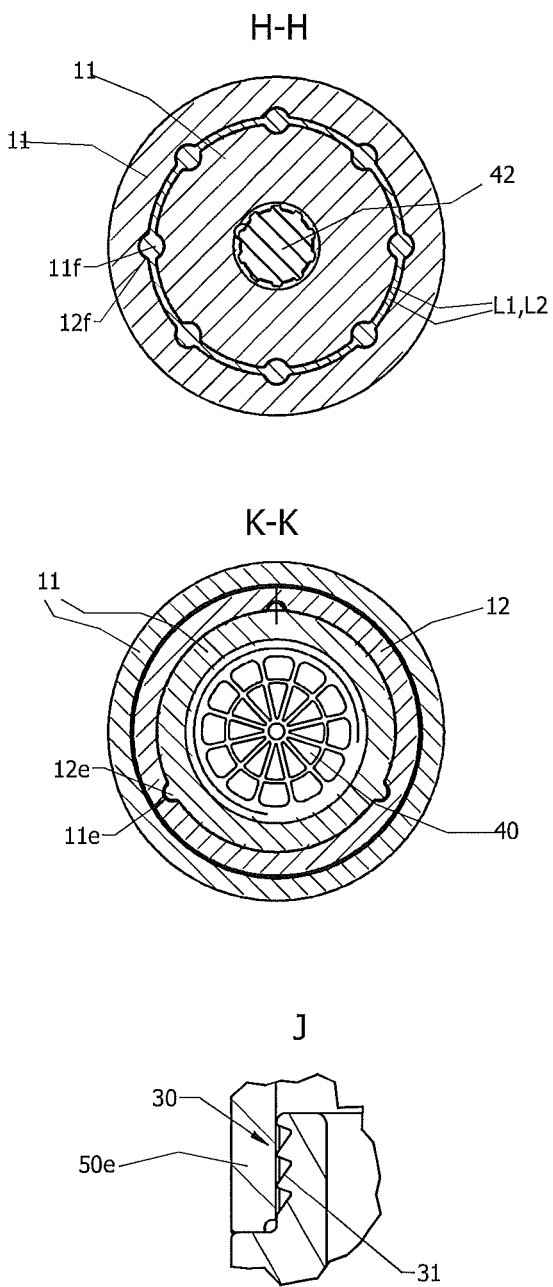
FIG. 4 shows the sections H-H, K-K and the enlargement J of FIG. 3.
Figure 5:
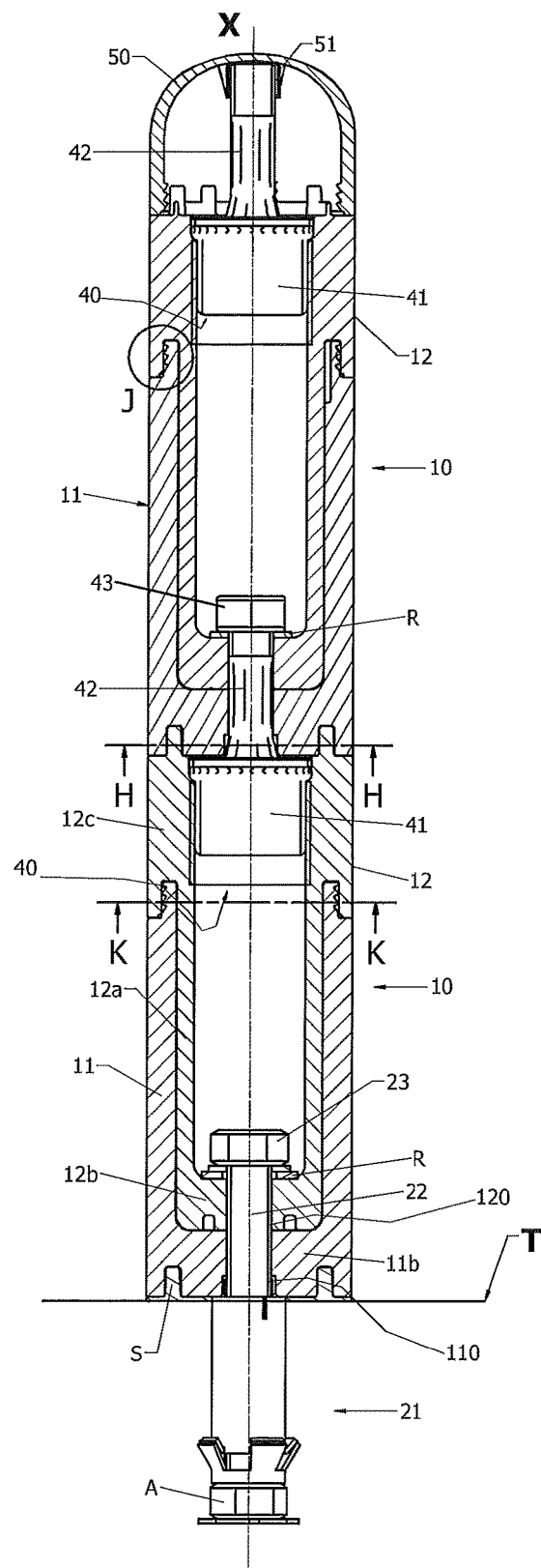
FIG. 5 shows a fourth embodiment of the protection according to the present invention, in a section view taken on an axial plane containing a longitudinal axis (X)
Figure 6:
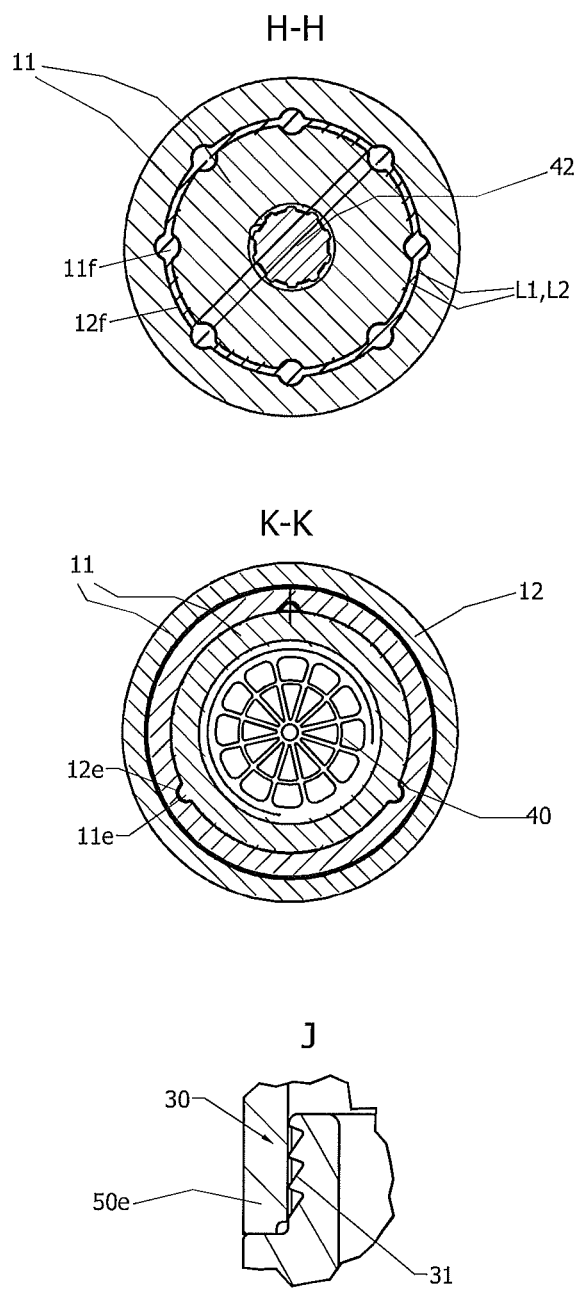
FIG. 6 shows the sections H-H, K-K and the enlargement J of FIG. 5.

As can be seen in FIGS. 2, 3 and 5, the inner body (12) is inserted at least partially into the outer body (11). In the area of insertion, the outer side walls of the inner body (12) are substantially abutting against the inner walls of the outer body (11). This configuration imparts a considerable resistance to the main module (10), despite maintaining good elastic properties. The hollow conformation of the outer body (11) and inner body (12) makes it possible to produce the same by die-casting, with considerable savings in terms of production costs.

The main module (10), comprising the outer body (11) and the inner body (12), is constrainable to a base (T), i.e. a floor, or another supporting surface.

In the embodiments of FIGS. 2, 3 and 5 the anchorage means (21) is structured so as to removably constrain the outer body and the inner body (11, 12) to the base (T). The anchorage means (21) is associable with the inner body (12) so as to fasten the inner body (12) to the outer body (11) and to the base (T).

In particular, the rod (22) is disposed in the seat passing through the outer body (11) and the inner body (12). In particular, in the preferred embodiment the rod (22) is disposed through the bottom portion (11b) of the outer body (11) and the bottom portion (12b) of the inner body (12), so that the fastening element (23) is placed in such a way as to be tightened in contact with the bottom portion (12b) of the inner body (12). In particular, the inner body (12) preferably has an internal cavity. The rod (22), or at least one end portion thereof, is disposed inside the internal cavity of the inner body (12). The fastening element (23) is disposed inside the internal cavity of the inner body (12). As can be seen in FIGS. 2, 3 and 5, the fastening element (23) is tightened in contact with an upper surface of the bottom portion (12b) of the inner body (12). One or more washers (R) can be interposed between the fastening element (23) and the upper surface in order to distribute the tightening force over a larger surface.

The hollow conformation of the outer body (11) and inner body (12), each delimited by its own bottom portion (11b, 12b), allows the anchorage of the main module (10) to be maintained in a lower area, substantially coinciding with the area of the bottom portions (11b, 12b). This makes it possible for most of the impact energy to be absorbed by the outer body (11) and inner body (12), thus reducing the stresses on the anchorage means, and, if it is made of polymeric plastic material, the impact energy is elastically absorbed and transmitted only to a limited degree to the anchorage means (21).

Advantageously, the bottom portions (11b, 12b) of the outer body (11) and inner body (12) can be provided with additional mutually aligned through seats (110, 120) for accommodating a supplementary retaining element, not illustrated. The retaining element can be, for example, in the form of a cable constrained to the base (T) and to the inner body (12). The function of the supplementary retaining element is to hold the main module (10) in place in the event of breakage of the anchorage means (21).

In the embodiments of FIGS. 3 and 5, the protection comprises a connection means (11e, 12e) structured so as to prevent relative rotations between the outer body and the inner body (11, 12) around the longitudinal axis (X). To this end, the connection means (11e, 12e) comprises at least a prismatic coupling between the outer body (11) and the inner body (12). The prismatic coupling can be obtained, for example, by disposing ribs (11e) and grooves (12e) of mating shape parallel to the longitudinal axis (X) between the outer body (11) and the inner body (12), as can be seen in the section K-K in FIGS. 4 and 6.

Packing and sealing rings can be provided in the area of the connection means to improve tightness against the infiltration of liquid.

The main module (10) defines in itself a complete anti-impact protection.

Advantageously, the protection according to the present invention comprises a coupling element (40), structured so as to enable the removable connection, to the main module (10), of a second outer body (11) wholly identical to the outer body (11) already described. In particular, the coupling element (40) enables a second outer body (11) to be connected on top of main module (10), thus making it possible to increase the total height of the anti-impact protection along the longitudinal axis (X).

In a preferred embodiment, the coupling element (40) comprises an engagement portion (41), structured so as to engage with the outer body (11), in the versions in FIGS. 1 and 2, or with the inner body (12) in the versions in FIGS. 3 and 5. In particular, a threaded coupling is provided between the engagement portion (41) and the outer body (11) or the inner body (12) of the module (10). In the embodiments of FIGS. 1 and 2, the inner body (11) is provided with a cylindrical cavity open at the top, which is provided with an internal thread in the area of the upper end. The engagement portion (41) in turn is externally threaded so that it can be screwed into the cavity of the outer body (11). In the embodiments of FIGS. 3 and 5, the inner body (12) is provided with a cylindrical cavity open at the top, which is provided with an internal thread in the area of the upper end. The engagement portion (41) is screwed into the cavity of the inner body (12).

The coupling element (40) further comprises a rod (42), disposed in the seat passing through the bottom portion (11b) of the second outer body (11). The coupling element (40) is structured so as also to enable the connection of a second inner body (12) to the main module (10). To this end, the rod (42) can be disposed in the seat passing through the bottom portion (11b) of the second outer body (11) and the bottom portion (12b) of the second inner body (12), if the latter is present.

The coupling element (40) comprises a fastening element (43), constrainable to the rod (42) and structured so as to fasten the second outer body (11) or the second inner body (12) to the main module (10). Preferably, the rod (42) comprises an outer thread and the fastening element (43) is in form of a nut screwable onto the rod (42).

FIGS. 1, 2, 3 and 5 illustrate solutions in which only a second outer body (11) is associated with the main module (10) by means of the coupling element (40). As already described, the outer body (11) is provided with a cavity, delimited at the bottom by the bottom portion (11b), which is provided with a through hole for accommodating the rod (42). The rod (42) protrudes inside the cavity of the second outer body (11). The fastening element (43) is likewise disposed inside the cavity so as to be tightened in contact with the upper surface of the bottom portion (11b). A spacer element (D) can be interposed between the fastening element (43) and the bottom portion (11b), also in order to distribute the tightening force over a larger surface. The spacer (D) distributes the tightening forces over a larger surface area of material which, consequently, is subjected to lower pressures and can react elastically also to greater stresses transmitted by the coupling element (40).

FIG. 5 illustrates a solution in which a second outer body (11) and a second inner body (12) are associated with the main module (10). The second inner body (12) comprises an internal cavity, delimited by the bottom portion (12b). The rod (42) of the coupling element (40), or at least one end portion thereof, is disposed inside the internal cavity of the second inner body (12). The rod (42) is in fact disposed in the seat passing through the bottom portions (11b, 12b) of the lower and upper bodies (11, 12). The fastening element (43) is disposed inside the internal cavity of the second inner body (12) so that it can be tightened in contact with an upper surface of the bottom portion (12b) of the second inner body (12). In this solution as well, one or more washers (R) can be interposed between the fastening element (43) and the bottom portion (12b) of the second inner body. The washers (R) distribute the tightening forces over a larger surface area of material which, consequently, is subjected to lower pressures and reacts elastically to greater stresses transmitted by the rod (42).

A further outer body (11), or a further outer body (11) and a further inner body (12), could be constrained on top of the second inner body (12) by means of a second coupling element (40). In FIG. 5 the second coupling element (40) is used to connect a cover (50), which will be described below, but it is easy to understand how a further outer body (11), or a further outer body (11) and a further inner body (12), could be applied in the place of the cover (50), according to the methods already described, thus creating an anti-impact protection composed of several main modules (10) aligned along the longitudinal axis (X). Essentially, the conformation of the outer and inner bodies (11, 12) and of the coupling element (40) enable the length of the anti-impact protection to be increased, making it possible to connect the necessary number of outer and inner bodies (11, 12) to the lower main module (10).

The coupling element or elements (40) present enable the stresses due to impacts to be transferred to the various outer bodies (11) and inner bodies (12), thus attenuating the stresses transmitted to the anchorage means (21).

Preferably, the outer body (11) has recesses and/or projections (11f) of a pre-established shape on a lower end surface thereof. The inner body (12) has corresponding recesses and/or projections (12f) on an upper end surface thereof. The recesses and/or projections, which substantially define the coupling means relative to the rotation around the longitudinal axis (X), are configured to engage with each other when an outer body (11) is placed on top of a lower inner body (12), as shown in FIGS. 3 and 5, to prevent the relative rotations around the longitudinal axis (X). Advantageously, the recesses and projections (11f, 12f) are structured so as to be coupled together in a liquid tight manner. Moreover, as can be seen in the section H-H in FIGS. 4 and 6, a labyrinth seal (L1, L2) can be interposed between the recesses (11f) and the projections (12f) in order to further increase the seal against the infiltration of liquids. In a preferred embodiment, the projections (12f) are in the form of pins distributed along a circumference concentric with the longitudinal axis (X) and are connected to one another by a circular lip. The pins (12f) and lip (L1) project from the upper surface of the inner element (12). The recesses (11f) have a shape mating that of the pins (12f) and are joined by a circular seat (L2) intended to receive the lips (L1) so as to form the labyrinth seal. The recesses (11f) and the circular seat (L2) are fashioned on the lower surface of the outer element (11).

The recesses and/or projections of the outer body (11) can be used to enable a coupling of the outer body (11) of the lower main module (10) with an elastic element (S), which can be interposed between the bottom portion (11b) and the base (T) so as to seal the lower main module (10) at the bottom.

The anti-impact protection can be provided with a cover (50), illustrated in FIGS. 1, 2, 3 and 5. The cover (50), which preferably has a dome or hemispherical shape, has an engagement portion (51) at the bottom, which is configured to removably engage with the coupling element (40). In this manner, the cover (50) is removably associable with the main module (10) by means of the coupling element (40). In the embodiments of FIGS. 1 and 2, the engagement portion (51) has an outer thread so as to be screwed onto the upper portion of the outer body (11), substantially in the place of the coupling element (40).

In FIG. 5, the cover (50) is associated with the second inner body (12) by means of the second coupling element (40), but the cover (50) could actually be associated with the main module (10) by means of the first coupling element (40). In particular, the engagement portion (51) of the cover (50) is in the form of a female screw structured so as to be screwed onto the rod (42) of the coupling element (40). Alternatively, the engagement portion (51) can be structured so as to be snap fitted onto the rod (42), without needing to be actually screwed. In such a case it is possible to provide an engagement means which prevents the relative rotation between the cover (50) and the outer body (11). Such a means preferably comprises three ribs, not illustrated, intended to engage with the grooves (11e) of the outer body (11) or to interfere with the projections or pins (12f) of the inner body (12). The cover (50) can also be provided with seals to prevent the infiltration of liquids.

The cover (50) is moreover associable with the outer body (11) via a connection means (30), as shown in FIG. 1. Essentially, the connection means (30) is structured so as to removably constrain the outer body (11) and the cover (50) to each other with respect to relative movements along a longitudinal axis (X).

To this end, as shown in the enlargements J in FIGS. 3 and 5, the connection means (30) comprises circular ribs (31) with a sawtooth-shaped cross section. These ribs are distributed over the outer surface of an upper end portion (11e) of the outer body (11) and over an inner surface of an engagement edge (50e) of the cover (50). The upper end portion (11e) of the outer body (11) and the inner surface of the engagement edge (50e) of the cover (50) are disposed in such a way as to be positioned in contact with each other, so that the ribs engage with each other to prevent the cover (50) from slipping off the outer body (11). The connection means (30) also comprises elements that prevent the relative rotation between the cover (50) and outer body (11). These elements are substantially in the form indicated in the section K-K in FIGS. 4 and 6.

The invention claimed is:

1. A modular anti-impact protection device comprising: a first outer body, which has at least one internal cavity and a bottom portion in which a through seat is fashioned; an anchorage means, structured so as to removably constrain the first outer body to a base, and which comprises a rod disposed in the through seat of the bottom portion; the modular anti-impact protection device further comprising a coupling element structured so as to enable the connection of a second outer body to the first outer body, wherein the coupling element comprises an engagement portion, structured so as to engage with the first outer body, and a rod, disposed in a seat passing through a bottom portion of the second first outer body;

wherein the first outer body is provided with a cylindrical cavity open at the top, which is provided with an internal thread in the area of an upper end, and the engagement portion is externally threaded, so that it can be screwed into the cylindrical cavity of the first outer body.

2. The anti-impact protection device according to claim 1, wherein the anchorage means comprises a fastening element, constrainable to the rod and structured so as to fasten the outer body to the base.

3. The anti-impact protection device according to claim 2, wherein the fastening element is placed in such a way as to be tightened in contact with the bottom portion of the outer body.

4. The anti-impact protection device according to claim 2, wherein the rod is provided with an outer thread and the fastening element comprises a nut structured so as to be screwed onto the thread of the rod.

5. The anti-impact protection device according to claim 1, comprising an inner body having at least one internal cavity, and configured to be inserted at least partially into the cavity of the first outer body.

6. The anti-impact protection device according to claim 5, wherein the inner body comprises a bottom portion provided with a through seat aligned with the through seat of the bottom portion of the first outer body.

7. The anti-impact protection device according to claim 5, wherein the anchorage means is structured so as to removably constrain the first outer body and the inner body to a base, and which is associable with the inner body in order to fasten the inner body to the first outer body and to the base.

8. The anti-impact protection device according to claim 6, wherein the rod is disposed in the through seats of the bottom portions of the first outer body and the inner body.

9. The anti-impact protection device according to claim 2, further comprising an inner body having at least one internal cavity, and configured to be inserted at least partially into the cavity of the first outer body, wherein the fastening element is constrainable to the rod and is configured to fasten the first outer body between the inner body and the base.

10. The anti-impact protection device according to claim 9, wherein the fastening element is placed in such a way as to be tightened in contact with the bottom portion of the inner body.

11. The anti-impact protection device according to claim 9, wherein: the inner body comprises an internal cavity; at least one end portion of the rod, is disposed inside the internal cavity of the inner body; the fastening element is disposed inside the internal cavity of the inner body.

12. The anti-impact protection device according to claim 11, comprising at least one washer interposed between the fastening element and an upper surface of a bottom portion of the inner body.

13. The anti-impact protection device according to claim 5, comprising a connection means structured so as to removably constrain the outer body and the inner body to each other.

14. The anti-impact protection device according to claim 13, wherein the connection means is structured so as to prevent relative rotations between the outer body and the inner body around a longitudinal axis.

15. The anti-impact protection device according to claim 1, comprising an elastic element, disposed in contact with a bottom portion of the first outer body, and configured to be interposed between the bottom portion and the base so as to prevent the infiltration of liquid into the module.

16. The anti-impact protection device according to claim 5, comprising a supplementary retaining element passing through bottom portions of the first outer body and inner body, and which is configured to be connected to the base.

17. The anti-impact protection device according to claim 5, wherein the engagement portion is structured so as to engage with the inner body of the module.

18. The anti-impact protection device according to claim 17, wherein a second coupling element is structured so as to enable the connection of a second inner body to the second outer body.

19. The anti-impact protection device according to claim 18, wherein a second rod is disposed in a seat passing through a bottom portion of the second outer body and through a bottom portion of the second inner body.

20. The anti-impact protection device according to claim 19, wherein the second coupling element comprises a fastening element, constrainable to the second rod and structured so as to fasten the second outer body or the second inner body to a top of the module.

21. The anti-impact protection device according to claim 19, wherein the second inner body comprises an internal cavity; at least a portion of the second rod of the second coupling element, is disposed inside the internal cavity of the second inner body; the fastening element is positioned inside the internal cavity of the second inner body.

22. The anti-impact protection device according to claim 20, comprising a spacer interposed between the fastening element and an upper surface of a bottom portion of the second outer body.

23. The anti-impact protection device according to claim 1, comprising a cover associable with the first outer body by a connection means structured so as to prevent relative movements between the first outer body and the cover along a longitudinal axis.

24. The anti-impact protection device according to claim 1, comprising a cover, removably associable with the module by means of a coupling element.

25. The anti-impact protection device according to claim 5, comprising; a coupling means structured so as to prevent rotation of the cover about the longitudinal axis relative to the first outer body and/or the inner body.

* * * * *